United States Patent Office 2,862,016
Patented Nov. 25, 1958

2,862,016

PROCESS FOR PREPARATION OF ALKALI SALTS OF O,O-THIOLPHOSPHORIC ACID ASYMMETRICAL DIESTERS

Richard Sallmann, Basel, and Paul Kohler, Aigle, Switzerland, assignors to Ciba Limited, Basel, Switzerland, a Swiss firm No Drawing. Application February 21, 1955
Serial No. 489,804

Claims priority, application Switzerland March 4, 1954

2 Claims. (Cl. 260—461)

It is known that asymmetrical dialkyl phosphites can be made by trans-esterification. Thus, for example, ethyl butyl phosphite can be made by heating diethyl phosphite with butanol. The asymmetrical dialkyl phosphites of low molecular weight can be distilled under reduced pressure, but it is known that attempts to distil ethyl decyl phosphite lead to decomposition of this compound.

It is also known that dialkyl thiophosphates can be obtained by the additive combination of sulfur with a dialkyl phosphite in the presence of a salt-forming compound. This reaction has been described only for use with symmetrical dialkyl phosphites of low molecular weight.

The present invention is based on the observation that valuable new asymmetrical esters of thiophosphoric acid of the general formula

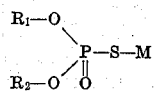

in which $R_1$ represents the radical of an alcohol, $R_2$ represents the radical of an alcohol different from that of $R_1$, and M represents a cation, can be made by the additive combination of sulfur with a compound of the general formula

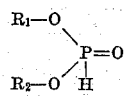

in which $R_1$ and $R_2$ have the meanings given above, in the presence of a substance yielding the cation M.

The starting materials of the general formula last mentioned above are asymmetrical esters of phosphorous acid. The radical $R_1$ may be of cycloaliphatic or more especially aliphatic nature. It is advantageously the radical of an aliphatic alcohol of low molecular weight, such as methyl alcohol, ethyl alcohol or propyl alcohol. The radical $R_2$ must be different from the radical $R_1$. The radical $R_2$ may be of heterocyclic, araliphatic, cycloaliphatic or especially aliphatic nature.

Advantageously it is of higher molecular weight than the radical $R_1$. However, these two radicals may have substantially the same molecular weight and differ in that the radical $R_1$ is aliphatic and the radical $R_2$ is, for example, araliphatic or heterocyclic. The aliphatic radicals, which the symbol $R_2$ may represent, may have a straight or branched chain and be saturated or unsaturated. They may also be substituted or unsubstituted. There may be mentioned, for example, the following groups: ethyl, propyl, isopropyl, butyl, hexyl, 2-ethylbutyl, octyl, 2-butyloctyl, dodecyl, octadecenyl, octadecyl, allyl or 2-chlorethyl groups; and also radicals containing thiocyano, cyano, or ether groups or halogen atoms. Among the araliphatic radicals, which $R_2$ may represent, there may be mentioned the benzyl group, among cycloaliphatic radicals the cyclohexyl group, and among heterocyclic radicals, the tetrahydrofurfuryl group. Especially valuable starting materials are dialkyl phosphites, in which $R_1$ represents the radical of a lower aliphatic alcohol containing 1–4 carbon atoms, and $R_2$ represents the radical of a higher aliphatic alcohol containing about 8–30 carbon atoms. Among these phosphites there may be mentioned, for example, methyl dodecyl phosphite and ethyl octadecyl phosphite. The asymmetrical esters of phosphorous acid used as starting materials are either known or can be made by methods in themselves known. An especially suitable method for preparing these compounds is the trans-esterification of symmetrical phosphites hereinbefore referred to.

As substances yielding the cation M, in the presence of which the additive combination with sulfur is carried out, there may be used the same substances as those used in the preparation of the symmetrical thiophosphoric acid derivatives. Among these substances there may be used the alkali metals originally used for preparing the alkali metal salts of the phosphites, and also alkali metal alcoholates, ammonia or an amine such as dimethylamine or monoethylamine. Finally, there may also be mentioned alkali metal carbonates or bicarbonates.

The additive combination of the process of this invention is advantageously carried out in an organic solvent. When an alkali metal is used as the substance yielding a cation it is of advantage to use solvents such as benzene, toluene or xylene. When another salt-forming substance mentioned above is used the solvent is advantageously an alcohol, such as methyl alcohol, ethyl alcohol or isopropyl alcohol. The condensation may be carried out at the ordinary or a slightly raised temperature, for example, at 30–100° C. Since the reaction is frequently exothermic at the outset, it may be necessary or advantageous to cool the reaction mixture. The sulfur is usually added in the theoretical quantity. Any excess can easily be removed by filtration.

The new compounds are obtained in good yield and are equally stable in solution and in solid form. The alkali metal and ammonium salts are generally soluble or easily dispersible in water. Compounds containing aliphatic radicals of high molecular weight also dissolve well in a very wide variety of organic solvents. The new products can be used for very many different purposes in industry, for example, as intermediate products for the manufacture of pest controlling agents and medicaments. Suitably substituted compounds can also be used as assistants in the textile, leather or paper industry, for example, as washing agents, wetting agents or foaming agents, and also as wetting agents in mercerising agents. By virtue of their solubility in organic solvents they can be used as additions to oils or lubricants, or as constituents of paints. Finally, suitably substituted compounds are useful as emulsifying or dispersing agents.

The following examples illustrate the invention the parts being by weight unless otherwise stated and the relationship of parts by weight to parts by volume being the same as that of the kilogram to the liter:

Example 1

4 parts of finely pulverized sulfur are suspended in a solution of 27.8 parts of dodecyl ethyl phosphite in 50 parts by volume of absolute alcohol. A current of dry ammonia is then passed into the mixture rather rapidly, while stirring. The temperature increases as the sulfur dissolves and is maintained below 30° C. by cooling. When the temperature falls, cooling is stopped and the temperature is allowed to rise to 40° C. When no further increase in temperature occurs, the whole is finally heated for a short time at 40–50° C. A small excess of sulfur is then removed by filtration, and the alcohol is distilled off in vacuo at 60–70° C. There is obtained in good yield the ammonium salt of dodecyl-ethyl-thiophosphoric acid in the form of a soft colorless mass, which is easily soluble in water. Its aqueous solutions foam strongly, have a neutral reaction, are stable of heat and remain clear after the addition of a weak acid, for example, acetic acid. The water-insoluble dodecyl-ethyl-thiophosphoric acid precipitates out on the addition of sulfuric acid. The salts of this compound are easily soluble in the usual organic solvents.

The dodecyl ethyl ester of phosphorous acid used above is prepared as follows: A mixture of 30 parts of commercial laurol and 41 parts of diethyl phosphite is heated at an oil bath temperature of 140–145° C. in a flask which is fitted with stirring means, and is connected to a descending condenser. During the heating a slow current of nitrogen is passed over the liquid. After about 15 minutes alcohol begins to distil and after about 40–45 minutes the reaction is practically complete. After the distillation ceases, the mixture is heated for a further 15 minutes. The excess of diethyl phosphite is then distilled off in vacuo at an oil bath temperature of 120–130° C., and the dodecyl ethyl phosphite remains behind in good yield in the form of a viscous oil.

*Example 2*

40 parts by volume of ether are added to a solution of 1.15 parts of sodium in 20 parts by volume of absolute alcohol, and then 13.9 parts of dodecyl ethyl phosphite are added. There are then added in portions, while cooling, 1.8 parts of sulfur powder, whereupon the reaction sets in with an increase in temperature and dissolution of the sulfur. When the temperature ceases to rise, the whole is boiled for one hour under reflux, filtered, and the alcohol and ether are distilled off. There is obtained the sodium salt having properties similar to those of the ammonium salt described in Example 1.

*Example 3*

13.9 parts of dodecyl ethyl phosphite are introduced dropwise into a suspension of 1.15 parts of sodium in 40 parts by volume of toluene. The temperature is maintained at 30–40° C. by cooling. When the addition is complete, the whole is heated for 15 minutes at 40° C., whereby a clear solution of the sodium salt is obtained. 1.6 parts of sulfur powder are then strewn in, while stirring, and the temperature is maintained at 50–60° C. by cooling. The sulfur gradually dissolves. When the addition is complete, the whole is heated for 30 minutes at 90–100° C., and the clear solution is evaporated in vacuo. The water-soluble sodium salt of dodecyl-ethyl-thiophosphoric acid is obtained in good yield.

*Example 4*

4 parts of sulfur powder are suspended in a solution of 34.8 parts of octadecyl methyl phosphite in 50 parts by volume of absolute alcohol. A rapid current of dry ammonia is introduced at 30–40° C., while stirring. The temperature is allowed to rise to 50° C. When the reaction is finished the temperature begins to fall and is maintained at 50° C. for a further 10 minutes. The whole is then diluted with a small quantity of alcohol, filtered through a warmed filter, and the filtrate is cooled. The ammonium salt of octadecyl-methyl-thiophosphoric acid then precipitates and can be filtered off with suction. After removing the alcohol, the product is obtained in the form of a white waxy mass which dissolves clearly in hot water.

The octadecyl methyl phosphite used in this example can be prepared in a manner analogous to that of the dodecyl ethyl phosphite described in Example 1.

*Example 5*

Into a solution of 13.2 parts of dodecyl methyl phosphite in 20 parts by volume of absolute alcohol there are strewn, while stirring, at room temperature first 1.8 parts of sulfur powder and then 4 parts of dry finely pulverized potassium carbonate. After stirring the mixture for one hour at room temperature, during which the temperature rises slightly, it is heated for 90 minutes at 60–70° C., whereupon the sulfur and also the potassium carbonate dissolve except for a small excess. The mixture is then cooled with ice water, in order to precipitate the sulfur in solution, and then diluted with 30 parts by volume of alcohol and filtered. The filtrate is freed from alcohol in vacuo at 50° C. There are obtained 16 parts of the potassium salt of dodecyl-methyl-thiophosphoric acid in the form of a white colorless mass which dissolves clearly in water. Its aqueous solution has a neutral reaction and possesses a strong foaming capacity.

*Example 6*

A solution of 13.2 parts of dodecyl methyl phosphite in 30 parts by volume of absolute alcohol is mixed with a mixture of 1.8 parts of sulfur and 3 parts of sodium carbonate. After having been stirred for 3 hours at 60–70° C. the sulfur and the sodium carbonate are dissolved except for a slight residue, and a test portion is soluble in water to give a clear solution. The reaction mass is cooled with ice and then diluted with 50 parts by volume of alcohol, filtered, and the filtrate evaporated in vacuo at 50° C. The sodium salt is obtained in the form of a soft, colorless mass which dissolves in water to give a clear solution. The aqueous solution has a neutral reaction and strong foaming capacity.

*Example 7*

17.2 parts of octadecenyl methyl phosphite are dissolved in 35 parts by volume of absolute alcohol. While stirring, there are added at room temperature first 2 parts of sulfur and then 4.5 parts of dry, pulverized potassium carbonate. After two hours' stirring during which time the temperature rises to about 30° C. and then falls again, the reaction mass is heated at 60–70° C. for 2 hours, after which a test portion is soluble in water to give a clear solution. After cooling, the reaction mass is diluted with 50 parts by volume of alcohol, filtered, and the filtrate evaporated in vacuo. 21 parts of a colorless, wax-like mass are obtained which dissolve in water to give a clear solution. The aqueous solution foams strongly and has good washing properties, even in hard water.

The octadecenyl methyl phosphite used in this example is prepared as follows: In a flask equipped with a stirrer and connected to a descending condenser, 134 parts of commercial olein alcohol are heated with 210 parts of dimethyl phosphite at an oil bath temperature of 140–150° C. During the heating time a current of nitrogen is slowly passed over the liquid. After about 15 minutes the alcohol begins to distil and after about 40–45 minutes the reaction is practically finished. After the distillation ceases heating is continued for a further 15 minutes. The excess dimethyl phosphite is then distilled off at an oil bath temperature of 120–130° C. under reduced pressure, the octadecenyl-methyl phosphite remaining behind in good yield in the form of an oil.

*Example 8*

(a) The procedure is as indicated in the first paragraph of Example 7, except that 284 parts of isooctyl-methyl-phosphite, 65 parts of sulfur and 128 parts of potassium carbonate are used, and that 380 parts of the potassium salt of isooctyl-methyl-thiophosphoric acid are obtained.

(b) The procedure is as indicated in the first paragraph of Example 7, except that 274 parts of isoamyl-methyl-phosphite, 65 parts of sulfur and 140 parts of potassium carbonate are used, and that 390 parts of the potassium salt of isoamyl-methyl-thiophosphoric acid are obtained.

(c) The procedure is as indicated in the first paragraph of Example 7, except that 175 parts of isobutyl-methyl-phosphite, 40 parts of sulfur and 84 parts of potassium carbonate are used, and that 255 parts of the potassium salt of isobutyl-methyl-thiophosphoric acid are obtained.

(d) The procedure is as indicated in the first paragraph of Example 7, except that 192 parts of cyclohexyl-ethyl-phosphate, 40 parts of sulfur and 79 parts of potassium carbonate are used, and that 262 parts of the potassium salt of the cyclohexyl-ethyl-thiophosphoric acid are obtained which can be recrystallized from alcohol.

(e) The procedure is as indicated in the first paragraph of Example 7, except that 200 parts of benzyl-ethyl-phosphite, 40 parts of sulfur and 80 parts of potassium carbonate are used and that 267 parts of the potassium salt of benzyl-ethyl-thiophosphoric acid are obtained.

(f) The procedure is as indicated in the first paragraph of Example 7, except that 194 parts of tetrahydrofurfuryl-ethyl-phosphite, 40 parts of sulfur and 78 parts of potassium carbonate are used, and that 249 parts of the potassium salt of the tetrahydrofurfuryl-ethyl-thiophosphoric acid are obtained.

The asymmetrical phosphate esters used in (a) to (f), above, can be obtained by trans-esterification as described in the second paragraph of Example 7.

Example 9

A solution of 9.2 parts of dodecyl-ethyl-phosphite in 10 parts by volume of absolute alcohol, and 5.5 parts of an alcoholic dimethylamine solution of 35 percent strength are mixed and into the mixture there are introduced gradually while stirring 1.3 parts of sulfur powder. The temperature is maintained below 30° C. by cooling. When the temperature does not rise any longer, the reaction mass is heated to 50–60° C. in the course of 30 minutes. It is then filtered and the alcohol and the excess dimethylamine distilled off in vacuo, after which the dimethylamine salt of the dodecyl-ethyl-ethiophosphoric acid is obtained in the form of a semi-solid mass.

Example 10

Test of the potassium salt of dodecyl-methyl-thiophosphoric acid as a foaming agent:

A solution of 0.06 gram of potassium dodecyl-ethyl-thiophosphate in 1 liter of water of 10 German degrees of hardness at 20° C. on vigorous agitation gives the following depth of foam:

| Immediately | after 1 minute | after 5 minutes | after 10 minutes |
|---|---|---|---|
| Cm. 55 | Cm. 50 | Cm. 40 | Cm. 25 |

The product is a very good foaming agent.

Example 11

Test of the potassium salt of the dodecyl-ethyl-thiophosphoric acid as a washing agent:

When washing greasy wool, the following results were obtained with a solution of 2 grams of potassium dodecyl-ethyl-thiophosphate in 1 liter of water of 20 German degrees of hardness at 45° C. (rating 5=very good washing effect; rating 1=no washing effect).

| first operation | second operation | third operation |
|---|---|---|
| 5 | 3–4 | 2–3 |

The product is a good washing agent.

What is claimed is:

1. A process for the manufacture of a water-soluble asymmetrical ester of thiophosphoric acid which corresponds to the formula

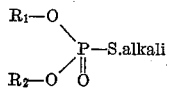

in which $R_1$ represents an alkyl radical containing 1–4 carbon atoms and $R_2$ represents a member of the group consisting of aliphatic hydrocarbon radicals containing 8–18 carbon atoms, and the cyclohexyl, benzyl and tetrahydrofurfuryl radicals, and "alkali" represents an alkali metal ion, which comprises combining sulfur additively with a compound of the formula

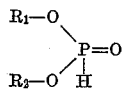

in which $R_1$ and $R_2$ have the meanings given above, in the presence of an alkali salt of carbonic acid.

2. A process for the manufacture of a water soluble asymmetrical ester of thiophosphoric acid of the general formula

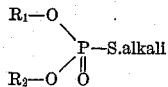

in which $R_1$ represents an alkyl radical containing 1–4 carbon atoms and $R_2$ represents an alkyl radical containing 8–30 carbon atoms and alkali represents an alkali metal ion, which comprises combining sulfur additively with a compound of the general formula

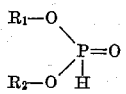

in which $R_1$ and $R_2$ have the meanings given above, in the presence of an alkali carbonate.

References Cited in the file of this patent

UNITED STATES PATENTS

| | | |
|---|---|---|
| 2,252,985 | Rutherford et al. | Aug. 19, 1941 |
| 2,447,288 | Smith | Aug. 17, 1948 |
| 2,595,170 | Rudel et al. | Apr. 29, 1952 |
| 2,597,534 | Schrader | May 20, 1952 |
| 2,632,020 | Hoegberg | Mar. 17, 1953 |
| 2,647,140 | Jonas | July 28, 1953 |
| 2,692,893 | Hechenbleikner | Oct. 26, 1954 |

OTHER REFERENCES

Kosalapoff, Organophosphorus Compounds, Wiley & Sons, 1950. pp. 235–236.